July 21, 1953 R. ALTSON 2,646,320
RAILROAD JOURNAL BOX
Filed Dec. 17, 1949 3 Sheets-Sheet 1

INVENTOR:
RALPH ALTSON
BY Romeyn A. Spare
HIS ATTORNEY.

July 21, 1953 R. ALTSON 2,646,320
RAILROAD JOURNAL BOX
Filed Dec. 17, 1949 3 Sheets-Sheet 2

INVENTOR:
RALPH ALTSON
BY Romeyn A. Spare
HIS ATTORNEY.

July 21, 1953 R. ALTSON 2,646,320
RAILROAD JOURNAL BOX
Filed Dec. 17, 1949 3 Sheets-Sheet 3

INVENTOR:
RALPH ALTSON
BY Romeyn A. Spare
HIS ATTORNEY

Patented July 21, 1953

2,646,320

UNITED STATES PATENT OFFICE 2,646,320

RAILROAD JOURNAL BOX

Ralph Altson, Elmhurst, N. Y., assignor to General Motors Corporation, Detroit, Mich., a corporation of Delaware Application December 17, 1949, Serial No. 133,601

12 Claims. (Cl. 308—180)

This invention relates to railroad journal boxes. The usual journal box has a rear end wall which surrounds the axle and is there provided with a close joint or some sealing means to exclude foreign matter and prevent leakage of lubricant along the axle. The axle is subject to longitudinal shifting movement in its bearings thus tending to alter the air pressure on the oil and both axle and box have considerable shake, resulting in surging movement of the oil and its leakage along the axle. An object of this invention is to prevent this surging movement from building up oil pressure at the seal or joint. Another object is to provide a box having efficient means at the interior for preventing leakage of oil between the axle and the rear end wall.

To these ends and also to improve generally upon devices of this character, the invention consists in the various matters hereinafter described and claimed. In the drawings Fig. 1 is a longitudinal, vertical central section of the box with the axle and bearings assembled.

Figure 1:
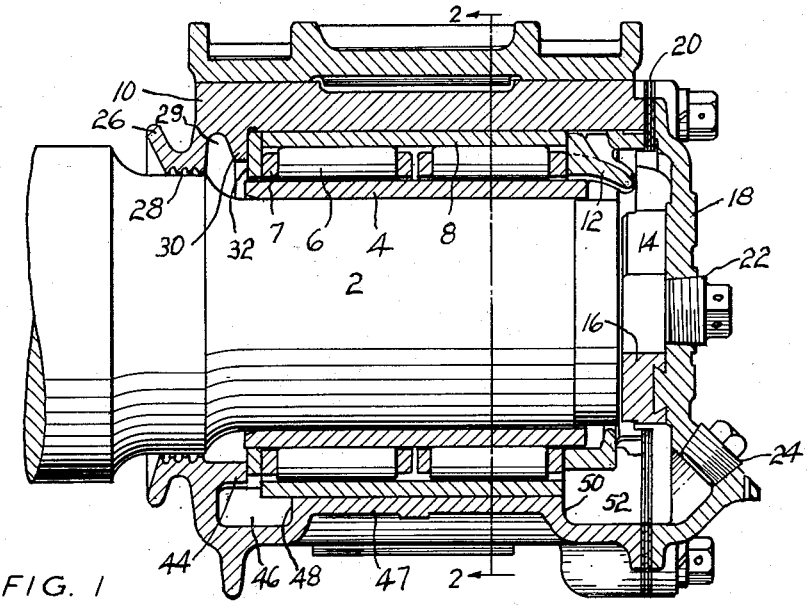
Figure 2:
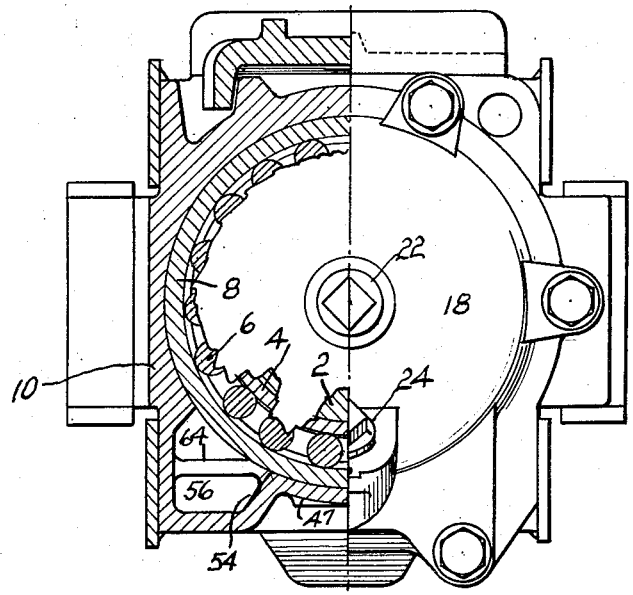
Fig. 2 is one half front end view and one half a section on line 2—2 of Fig. 1.
Figure 3:
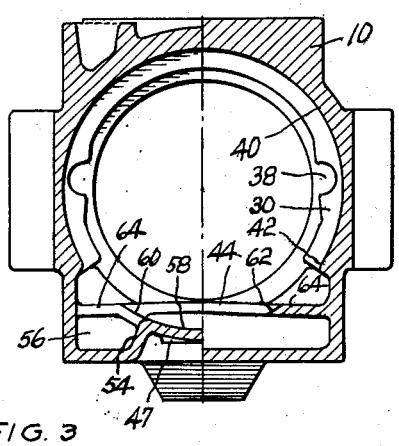
Fig. 3 is a cross section of the box structure alone on line 3—3 of Fig. 4.
Figure 4:
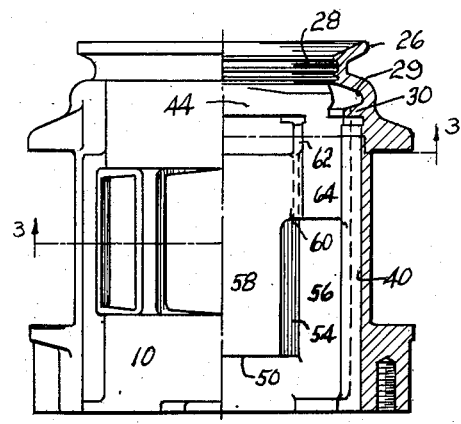
Fig. 4 is one half a top view of the box and one half a section on line 4—4 of Fig. 6.
Figure 5:
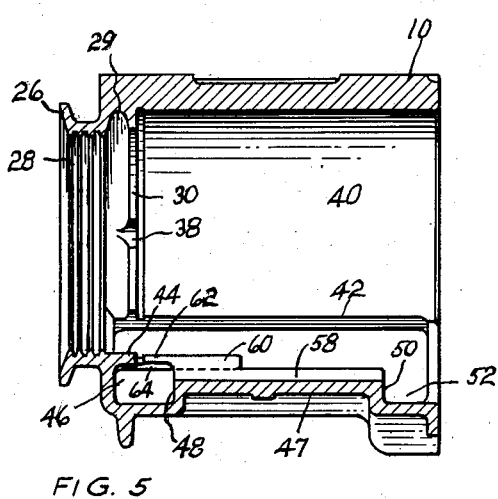
Fig. 5 is a longitudinal, vertical central section of the box.
Figure 6:
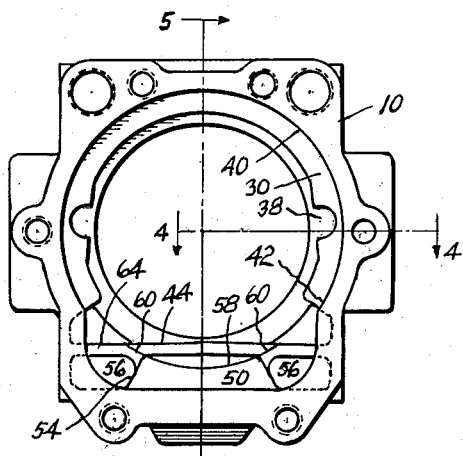
Fig. 6 is a front end view of the open end of the box.

The numeral 2 indicates a shaft or axle receiving an inner raceway sleeve 4 for rollers 6 having cages 7, the rollers running in an outer raceway sleeve 8 in a journal box 10. At one end of the sleeve 8 is the usual oil collecting ring 12 which collects oil from the bearings and delivers it to a slot 14 in a thrust block 16 cast on an end cap 18 which is bolted on the box with a series of shims 20. The middle of the cap has an inspection opening closed by a threaded plug 22 and lower down is a filling opening closed by a plug 24. The rear end wall of the box has the usual water guard 26 and a seal formed by grease grooves 28 making a close joint with the axle. Leakage of oil at this point has occurred in prior constructions and an important feature of the present invention is to provide certain barriers which will prevent surging oil from causing oil leakage at this joint.

Adjacent to the joint is an internal groove 29 one side of which is formed by a flange 30 which projects inwardly from the box. Between this flange and the raceway sleeve 8 is secured a barrier shown as a ring 32 having a flat 34 at the bottom and a pair of pins 36 projecting into recesses 38 in the flange to hold the ring from rotation when it is contacted by the adjacent bearing cage. The pins and the recesses are located above a diameter so that the ring cannot be inserted upside down. The bore 40 of the box is cylindrically curved over the upper portion and below it to the region 42. The exterior of the ring fits the bore of the box except where it overhangs a relief groove. One side of the ring abuts against the flange 30 but a portion near the flat 34 abuts against the inner end of a box projection or barrier 44 which extends forwardly into the box from the lower portion of the end wall and inclines downwardly in opposite directions from a central ridge. Below this projection and the adjacent raceway sleeve is a transverse passage 46 which is a part of an oil reservoir and from which oil can reach the bearings since the flat 34 terminates above the raceway sleeve and about even with the bottom of the adjacent cage ring. The bore of the ring 32 closely surrounds the inner raceway sleeve 4 so that no oil can spurt up to the axle and cause leakage at the seal.

A large four-sided protuberance 47 projects upwardly from the bottom of the box and forms the inside walls of a series of connected cavities or passages which make an oil reservoir. A rear transverse wall 48 on the protuberance forms one side of the passage 46 and a front transverse wall 50 forms one side of a transverse passage 52. Longitudinal slanting walls 54 form the inside walls of longitudinal oil passages 56 extending along the sides of the box. The top of the protuberance is a cylindrical wall or surface 58 having the same radius as the bore of the box and supporting the outer raceway sleeve at the bottom. The cylindrical wall 58 terminates short of the projection 44 to provide an opening therebetween and in this region is extended widthwise at 60 and lengthwise at 62 to join side walls or barriers 64 which incline downwardly towards the sides of the box and form side continuations of the projection 44. These side barriers may be extended forwardly to a greater extent than indicated and they provide strong bracing between the sides and ends of the box and the rear portion of the protuberance 47.

Figure 8:
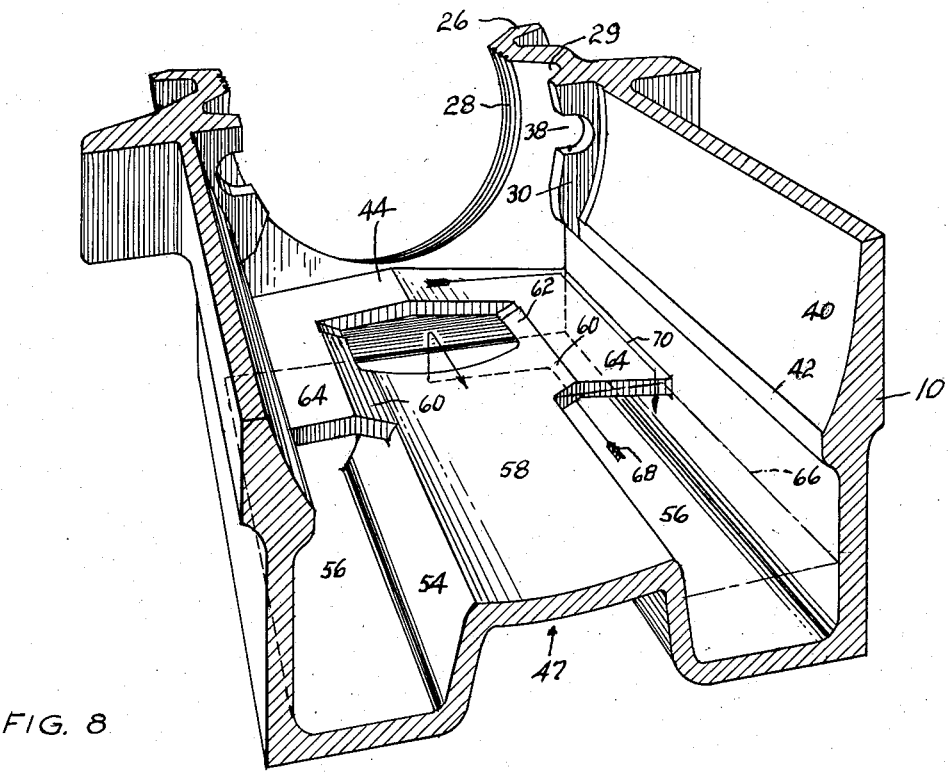
Fig. 8 is a perspective view of the box cut off transversely and longitudinally to disclose the interior construction at the rear and bottom.
Figure 7:
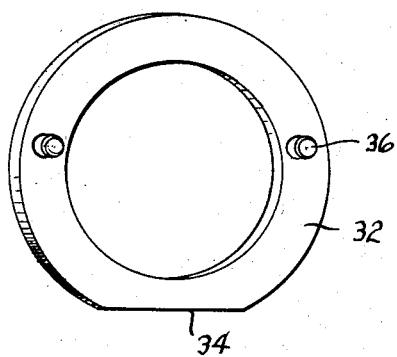
Fig. 7 is a perspective view of a detail.

The maximum oil level is indicated by the broken line 66 at the right of Fig. 8. The plug opening at 24 determines this level and the oil can run into the outer raceway sleeve at both ends. This oil is subject to surging due to motion of the box and axle. If the oil surges towards the rear of the box in the passages 56 as indicated by the arrow 68, the side barriers 64 together with the integral projection 44 and the ring 32 prevent it from reaching the underside of the axle and the seal at 28. If oil pressure is built up in the rear transverse passage 46, it can pass under the flat 34 of the ring 32 and between the outer periphery of the adjacent cage and the raceway sleeve 8 which overhangs the protuberance 47 to enter between the bearing rollers. The force of any spurt is directed towards the front of the box. Any oil that may get above the inclined side barrier 64 is kept near the sides of the box by the outer raceway sleeve 8 and the ring 32 and by the sidewise inclination of the barrier 64. Such oil may impinge against the end wall of the box at the corner but will drain back into the reservoir as indicated by the arrow 70. Some oil will be carried to the top of the axle by the rollers and work rearwardly but it will have to run around the axle to merely drain onto the inclined projection 44 which will direct it sidewise back into the reservoir.

I claim:

1. In a journal box having a shaft journalled in a bearing, the box having an oil reservoir provided with a transversely extending passage connected at its ends respectively with passages extending longitudinally along the sides of the box, a rear end box wall having an opening closely surrounding the shaft, the lower portion of the end wall having a projection extending beyond the end wall into the box over the transversely extending passage and sloping downwardly in opposite directions from the middle and connecting with the sides of the box, and end portions of said projection extending forwardly of the box over the passages along the sides of the box.

2. In a journal box having a shaft journalled in a bearing, the box having an oil reservoir and a rear end wall with an opening closely surrounding the shaft, the lower portion of the end wall having a projection extending into the box over a portion of the oil reservoir and sloping downwardly in opposite directions from the middle to connect with the sides of the box, and barrier walls joined to the said projection and extending forwardly along the sides of the box.

3. In a journal box having a shaft journalled in a bearing, the box having an oil reservoir and a rear end wall with an opening closely surrounding the shaft, the lower portion of the end wall having a projection extending into the box and sloping downwardly in opposite directions to join the sides of the box, a four-sided protuberance projecting upwardly from the bottom of the box and supporting the bearing, and sloping barrier walls joining the rear portion of the protuberance to the side walls of the box and to said projection.

4. In a journal box having a shaft journalled in a bearing, the box having an oil reservoir and a rear end wall with an opening closely surrounding the shaft, a four-sided protuberance projecting upwardly from the bottom of the box and supporting the bearing, and barrier walls connected to the side walls of the box and to the rear portion of the protuberance, said barrier walls sloping downwardly towards the side walls.

5. In a journal box having a shaft journalled in a bearing, the box having an oil reservoir and a rear end wall with an opening closely surrounding the shaft, the bottom of the box having an upwardly projecting protuberance whose upper surface supports the bearing, and barrier walls connecting the protuberance to the side walls and to the end wall of the box, the upper surface of said barrier walls sloping downwardly to the side walls.

6. In a journal box having a shaft journalled in a bearing, the box having a rear end wall with an opening closely surrounding the shaft, a four-sided protuberance projecting upwardly from the bottom of the box and supporting the bearing, the protuberance forming the inner walls of an oil reservoir extending around it, and barrier walls sloping downwardly towards the sides of the box and covering the oil reservoir at the rear of the box and part way forwardly along the sides.

7. In a journal box having a shaft journalled in a bearing mounted in said box, a bearing inner race ring within the box, the box having an oil reservoir at the bottom and having a rear end wall with an opening closely surrounding the shaft, the lower portion of the end wall having a projection extending into the box over a portion of the oil reservoir and sloping downwardly in opposite directions from a mid-portion and connecting with the sides of the box, and a barrier member abutting against the end of the projection and arching around the inner race of the bearing to close the space between said portion of the oil reservoir and said opening in the end wall.

8. In a journal box having a shaft journalled in a bearing within the box, the bearing having an inner race and an outer race, the box having an oil reservoir at the bottom and having a rear end wall with an opening closely surrounding the shaft, the lower portion of the end wall having a projection extending into the box over a portion of the oil reservoir, said projection sloping downwardly in opposite directions from a position beneath the shaft and connected to the sides of the box, and a barrier member abutting against the end of the projection and arching around the inner race of the bearing to close the space between said portion of the oil reservoir and said opening in the end wall, and the bottom of said barrier member being spaced from the outer race of the bearing to provide for access of oil to the bearing.

9. In a journal box having a shaft journalled in a bearing provided with an inner race, the box having an oil reservoir at the bottom and having a rear end wall with an opening closely surrounding the shaft, the lower portion of the end wall having a laterally disposed projection extending into the box over a portion of the oil reservoir, a flange above the end wall projection and extending radially inwardly adjacent to the bore of the box, and a non-rotatable ring demountably positioned against said flange and against the end of the projection and closely surrounding the inner race of the bearing.

10. In a journal box having a shaft journalled in a bearing, the box having a rear end wall with an opening surrounding the shaft, the bottom of the box having a protuberance projecting upwardly and extending substantially the length of said bearing, the longitudinal sides of the protuberance forming longitudinal oil passages with the sides of the box, one end of the protuberance forming a transverse oil passage with the rear end wall of the box, a barrier extending along the end wall and into engagement with the sides of the box for covering a portion of the transverse passage, and forwardly extending portions on said barrier projecting beyond the transverse passage and overlying portions of the longitudinal oil passages.

11. In a journal box having a shaft journalled in a bearing provided with an inner race and an outer race, the box having an oil reservoir at the bottom and having a rear end wall provided with an opening closely surrounding the shaft, the lower portion of the end wall having a projection extending into the box over a portion of the oil reservoir, a flange above the end wall projection and extending radially inwardly adjacent to said opening, and a non-rotatable ring abutting against the flange and abutting against the outer race and closely surrounding the inner race of the bearing, and the bottom of said non-rotatable ring being spaced from the outer race of the bearing.

12. In a journal box having a shaft journalled in a bearing provided with an inner race and with an outer race, the box having an oil reservoir at the bottom, a rear end wall on the box provided with an opening closely surrounding the shaft, the lower portion of the end wall having a projection extending laterally from the sides and from the end of the box over a portion of the oil reservoir, walls on said projection sloping from an intermediate position downwardly in opposite directions towards the sides of the box, a flange projecting radially inwardly from the sides of the box above said projection and adjacent to said opening, and a non-rotatable ring abutting against the flange and abutting against the outer race and closely surrounding the inner race of the bearing, and the bottom of said non-rotatable ring being cut away to space it from the outer race of the bearing.

RALPH ALTSON.

References Cited in the file of this patent

UNITED STATES PATENTS

| Number | Name | Date |
|---|---|---|
| 471,069 | Godley | Mar. 15, 1892 |
| 1,002,442 | Perkins | Sept. 5, 1911 |
| 1,882,478 | Brittain, Jr. | Oct. 11, 1932 |
| 1,984,823 | Brittain, Jr. | Dec. 18, 1934 |
| 2,360,737 | Steinmann | Oct. 17, 1944 |